United States Patent [19]
Parlette

[11] 3,820,659
[45] June 28, 1974

[54] DISSOLVED AIR CLARIFIER

[75] Inventor: Joseph N. Parlette, Pickering Village, Ontario, Canada

[73] Assignee: L. S. Love & Associates Limited, Brampton, Ontario, Canada

[22] Filed: Feb. 20, 1973

[21] Appl. No.: 334,038

[52] U.S. Cl.................. 210/195, 210/221, 210/525
[51] Int. Cl............................................ C02c 1/10
[58] Field of Search ........... 210/195, 220, 221, 523, 210/525

[56] References Cited
UNITED STATES PATENTS

| | | | |
|---|---|---|---|
| 2,647,869 | 8/1953 | Kelly | 210/221 X |
| 2,801,007 | 7/1957 | Thompson | 210/195 X |
| 3,397,788 | 8/1968 | Duff et al. | 210/195 |
| 3,764,012 | 10/1973 | Bohnke et al. | 210/195 |

Primary Examiner—Roy Lake
Assistant Examiner—DeWalden W. Jones
Attorney, Agent, or Firm—David M. Rogers

[57] ABSTRACT

A two stage clarifier having an outer annular laminar flow gravity clarifier tank encircling an inner circular dissolved air flotation clarifier tank, both tanks sharing a common wall. A common drive mechanism drives a sludge scraper in the outer tank and a scum skimmer in each tank. Part of the clarified effluent from the outer tank is gravity fed to the inner tank; the remainder is gravity fed to a pressure tank, pressurized with air, and discharged by air pressure, without pumps, into the inner tank through a conduit having a pressure relief valve at an end in the inner tank. Since the air pressure is released in the inner tank rather than in the conduit, the flotation efficiency is improved.

8 Claims, 10 Drawing Figures

DISSOLVED AIR CLARIFIER

This invention relates to a two stage clarifier for clarifying liquids containing particles in suspension.

Clarifiers are commonly used to remove suspended particles from liquids such as industrial or domestic waste water. When the particles in suspension have a specific gravity greater than that of the liquid in which they are suspended, clarification is usually accomplished by gravity settling (in which the particles settle to the bottom and are then removed). If the specific gravities of the particles and of the liquid in which they are suspended are similar, then clarification by dissolved air flotation is more effective than clarification by gravity separation. Clarification by dissolved air flotation is a process in which suspended particles are forced to the liquid surface by the action of minute air bubbles within the system. The minute air bubbles are formed by dissolving air in water under high pressure and releasing the air pressure within the flotation unit.

It has been normal practice in the past to construct separate gravity clarifier units and dissolved air flotation clarifier units. This arrangement has been expensive in terms of both capital costs and operating costs.

Accordingly, it is an object of the present invention to provide a combined gravity and air flotation clarifier having a number of unique design features. In a preferred embodiment of the invention, the gravity clarifier tank encircles the air flotation clarifier tank. Influent to the system is directed into the gravity clarifier and retained for an appropriate settling period before being discharged as effluent. The effluent from the gravity clarifier is divided into two portions, and one of those portions is fed by gravity to a pressure tank where it is pressurized with compressed air. The pressurized liquid is then propelled, by the pressure in the pressure tank, to the flotation clarifier. The remainder of the effluent from the gravity clarifier is fed directly, by gravity, to the flotation clarifier. This arrangement eliminates the need to recycle any part of the contents of the flotation clarifier to obtain aerated liquid, since aerated liquid is obtained from the effluent of the gravity clarifier. Further, since air pressure is used to propel the liquid, high pressure mechanical pumps are not required, in contrast with existing dissolved air flotation systems. With liquid pumps, mechanical considerations limit the pressure level to a maximum of 100 psi, whereas with the invention, much higher pressures (e.g. 500 psi) can be achieved, with a corresponding increase in operating efficiency.

In another aspect of the invention, the pressurized aerated liquid to be directed to the flotation clarifier is maintained under pressure until the moment of its release in the flotation clarifier. This is accomplished by a pressure relief valve located in the flotation clarifier. The release of the pressure in the pressurized and aerated liquid in the flotation clarifier, rather than in the conduit leading to that clarifier, ensures that the bubbles released in the flotation clarifier will be as small as possible, thereby improving the flotation. Since air pressure is used to propel the liquid, no pumps are required, thereby reducing both capital and operating costs.

Further objects and advantages of the invention will appear from the following description, taken together with the accompanying drawings, in which.

Figure 1:
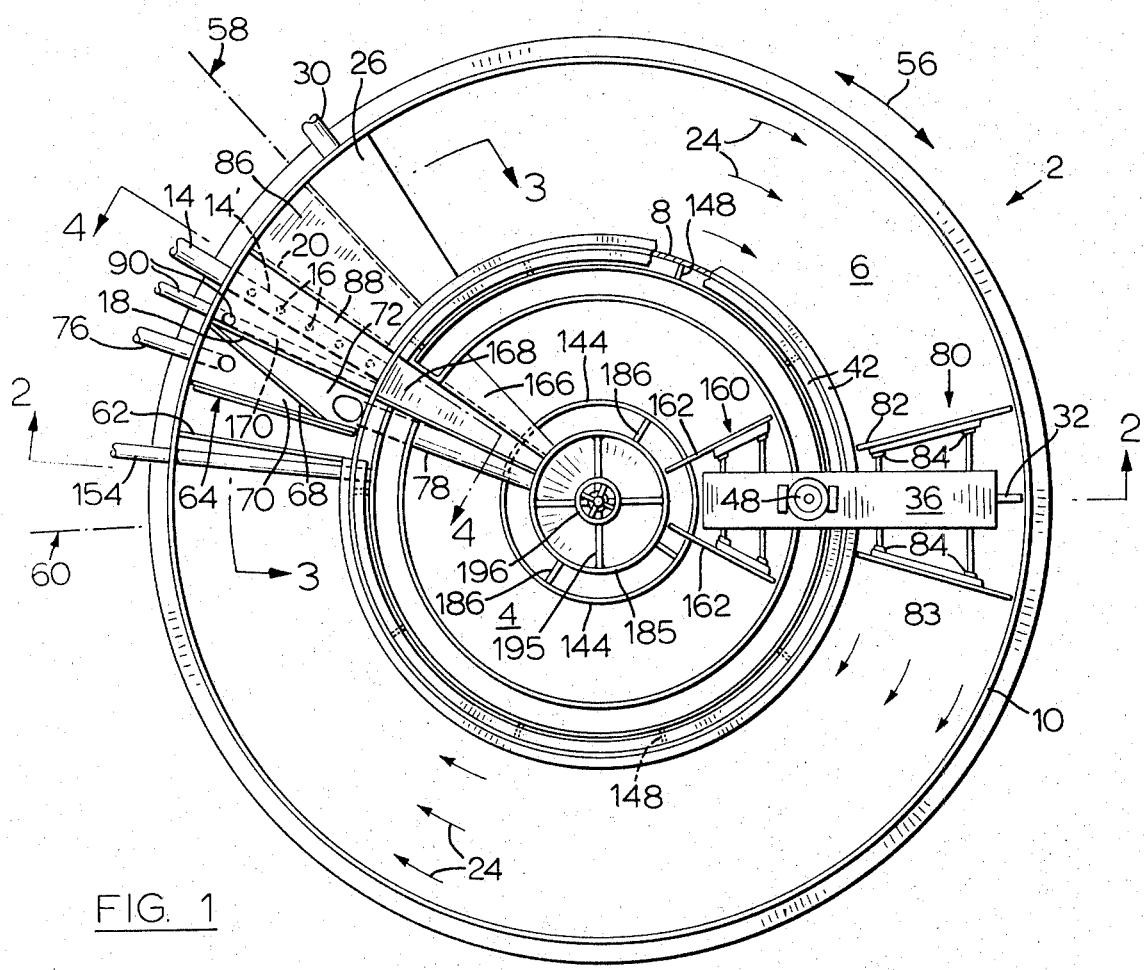
FIG. 1 is a top plan view of a two stage clarifier according to the invention.
Figure 2:
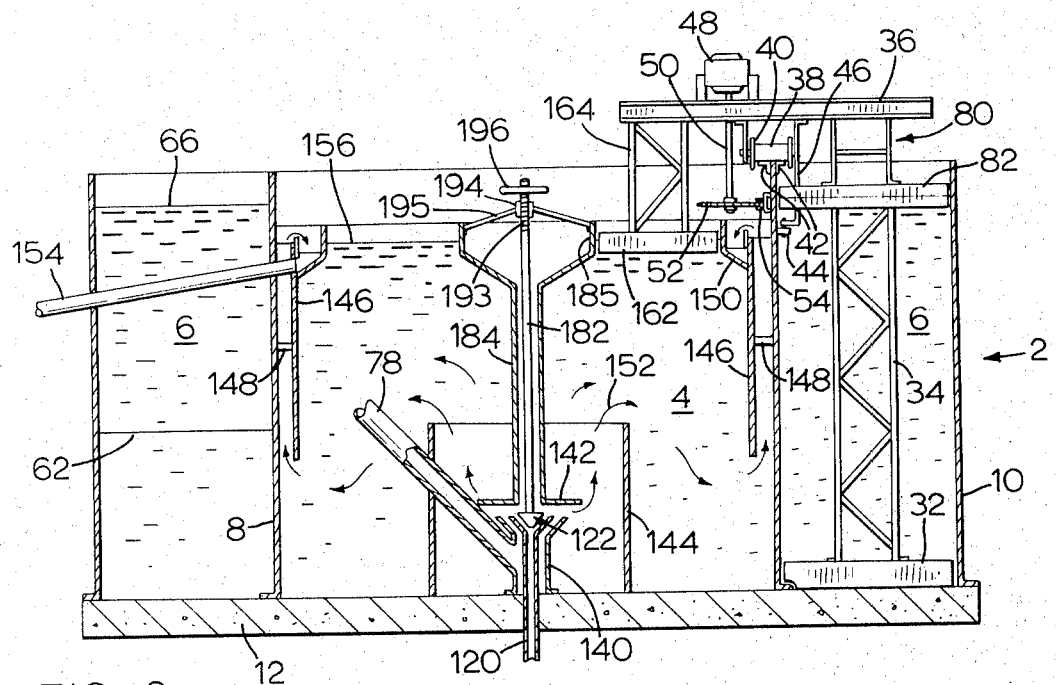
FIG. 2 is a sectional view taken along lines 2—2 of FIG. 1.
Figure 3:
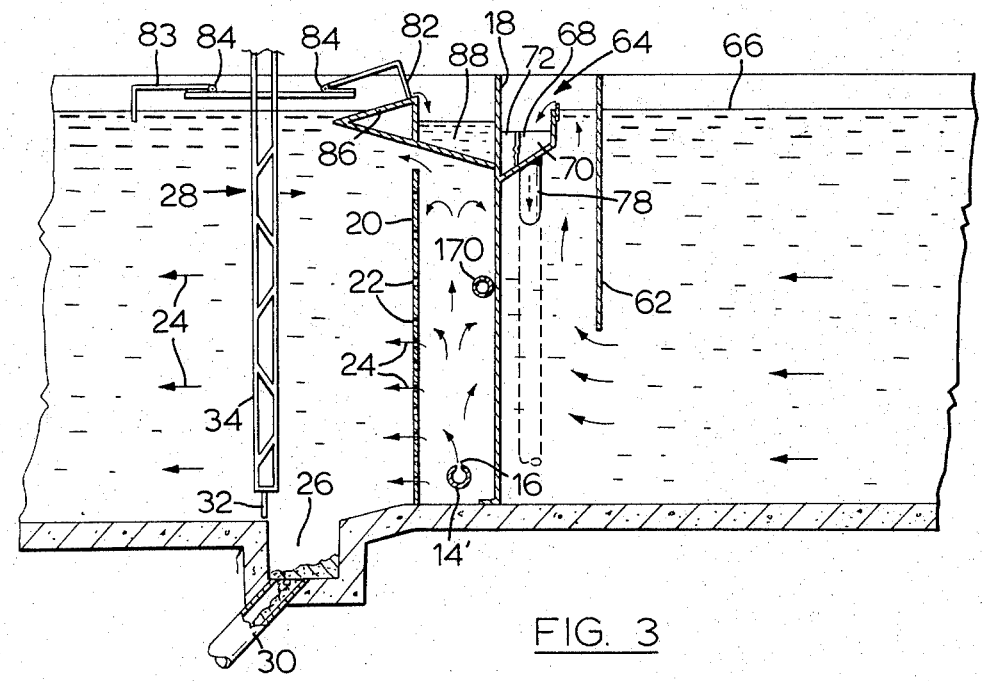
FIG. 3 is a developed section taken along lines 3—3 of FIG. 1 and also showing parts of a sludge scraper and scum skimmer mechanism.

Reference is first made to FIGS. 1 to 3, which show a two stage clarifier 2 according to the invention. The clarifier 2 includes a circular inner air flotation clarifier tank 4 and an outer gravity clarifier tank 6. The outer tank 6 is formed as an annulus around the inner tank 4, so that the two tanks have a common circular steel wall 8. The outer steel wall of the outer tank 6 is indicated at 10. Both tanks 4 and 6 have a common concrete base 12.

Influent is conducted firstly into the gravity clarifier tank 6, and after clarification there, the liquid is conducted into the flotation tank 4 for further treatment. The means for conducting influent into the gravity clarifier tank 6 include a conduit 14 (FIGS. 1, 3, 4) which extends through the outer wall 10 of tank 6 and across the width of the tank 6. The portion 14' of the conduit 14 located in the tank 6 contains a number of holes 16 to release influent into the tank 6.

As best shown in FIGS. 1 and 3, the conduit 14' is located between a divider plate 18 and a distributor plate 20. The distributor plate 20 contains a number of small holes 22 through which influent is released in an annular flow pattern as indicated by arrows 24. As the liquid travels in this annular flow pattern around the tank 6, settling occurs of all particles substantially heavier than the liquid in which they are suspended. The capacity of the outer tank 6 is made sufficient in relation to the influent flow to allow enough retention time (typically between one-half and six hours) to ensure adequate settling.

As particles settle to the bottom of the outer tank 6, they form a sludge which is raked into a sludge pocket 26 (FIGS. 1 and 3) by a rake 28 and discharged via conduit 30. The rake 28 comprises a scraper blade 32 suspended by a framework 34 from a horizontal bridge 36 (FIGS. 1, 2). The bridge 36 is mounted on rollers 38 having guide flanges 40 which retain the bridge in position on a track 42 fixed to the top of the common wall 8 between the tanks. A further roller 44 mounted on an arm 46 extending from the bridge 36 runs on the outer surface of the common wall 8 to help stabilize the bridge.

The bridge 36 is propelled by a motor-reducer unit 48 mounted on the top of the bridge. The unit 48 has a low speed driven shaft 50 having a large sprocket 52 fixed to its lower end. The sprocket 52 is oriented in a horizontal plane and meshes with a chain 54 secured to the inner surface of wall 8. The chain 54 in effect forms a rack, so that as the sprocket turns, the bridge 36 is driven along the top of wall 8.

Conventional controls are provided to reciprocate the bridge 36 along the path indicated by arrow 56 (FIG. 1) between limits 58, 60. As the bridge moves from limit 60 to limit 58, the scraper blade 32 scrapes settled sludge along the bottom of tank 6 and into sludge pocket 26. For the return trip back to limit 60, conventional means (not shown) are provided to raise blade 32 so that it does not scrape sludge when travelling from limit 58 to limit 60.

Electricity is fed to the motor-reducer unit 48 by conventional pickup rings not shown.

After the liquid in outer tank 6 has flowed around the circumferential length of the tank, it passes under a submerged baffle 62 (FIGS. 1, 2, 3) and travels upwardly to a launder 64 (FIGS. 1, 3) extending along the divider plate 18. The baffle 62 prevents floated material from contaminating the clarified liquid. The presence of the launder 64 holds the liquid level 66 (FIGS. 1, 3) in the outer tank 6 substantially aligned with the top of the launder 64.

In the launder 64, the clarified liquid from outer tank 6 is divided into two parts by a weir plate 68 (FIGS. 1, 3). The weir plate 68 extends diagonally across launder 64, dividing the launder 64 into two compartments 70 and 72. Clarified liquid pours initially into compartment 70, and exits by gravity from this compartment via a conduit 76 (FIG. 1). The conduit 76 leads to an aeration and pressurization unit, to be described. When the liquid flow into conduit 76 exceeds the capacity of that conduit, the remainder of the liquid flow into launder 64 overflows the low weir plate 68 and flows by gravity down a sloping conduit 78 (FIGS. 1 and 2) which extends through the wall 8 into the flotation tank 4. This arrangement ensures that an amount of liquid will be aerated adequate for the demands of the flotation unit, while the remainder of the clarified liquid from tank 6 is fed directly (without aeration) to the flotation tank 4.

Figure 4:
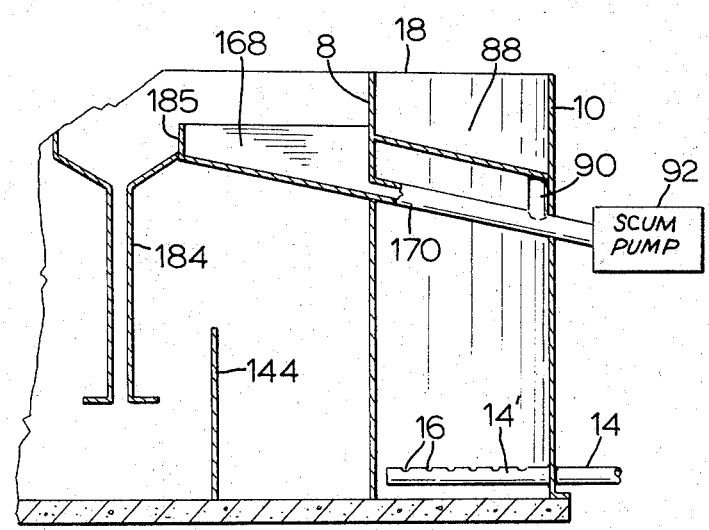
FIG. 4 is a sectional view taken along lines 4—4 of FIG. 1.

During the clarification process in the outer tank 6, some material will rise to the surface and form scum. The scum is removed by a conventional scum skimmer 80 connected to the framework 34 to move therewith. The scum skimmer consists of a pair of skimmer blades 82, 83 pivotally mounted at 84 (FIGS. 1, 3) on the framework 34 and moving in a path between the outer wall 10 of tank 6 and the common wall 8 of the tanks. The scum skimmed by the leading skimmer blade 82 is pushed up a scum box ramp 86 into a scum box 88 (FIGS. 1, 3, 4). The scum is removed from the scum box 88, via conduit 90 (FIGS. 1, 4), by a scum pump diagrammatically indicated at 92 (FIG. 4). Again, any desired conventional means are provided (not shown) to raise the scum skimmer blades 82, 83 so that they perform skimming during their travel from limit 60 to limit 58 but not on the return trip.

Figure 5:
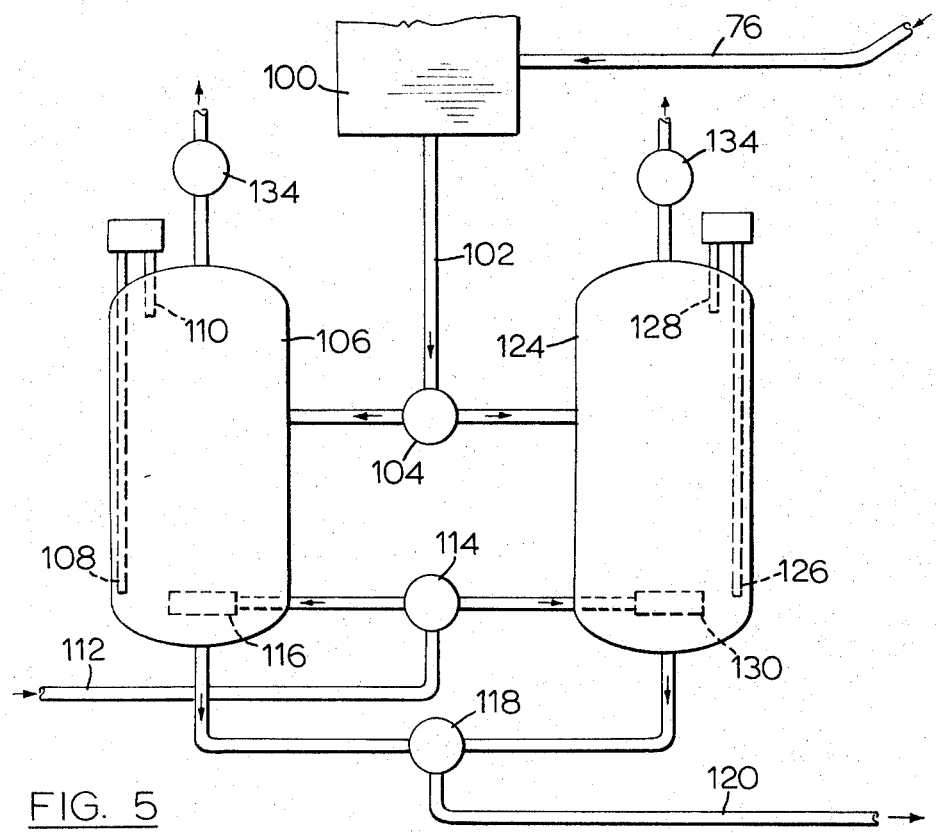
FIG. 5 is a schematic view showing an air dissolving system for use with the invention.

Reference is next made to FIG. 5, which shows the manner in which the portion of clarified liquid removed from the system via conduit 76 (FIG. 1) is aerated and pressurized. As shown in FIG. 5, the liquid in conduit 76 is directed by gravity to a receiving tank 100. Liquid from the receiving tank 100 flows by gravity through conduit 102, and via a solenoid operated three-way valve 104 into a pressure tank 106. The tank 106 contains a low liquid level probe 108 and a high liquid level probe 110 to detect when the level in tank 106 falls below or rises above the levels of probes 108, 110 respectively. When liquid entering tank 106 reaches the level of the upper probe 110, the three way valve 104 is closed (by conventional control means, not shown) and liquid flow accumulates for the time being in the receiving tank 100. Compressed air supplied via conduit 112 is then admitted via a solenoid operated three way valve 114 and through a suitable diffuser 116 into the tank 106. While the pressure tank 106 is brought up to operating pressure, liquid continues to accumulate in the receiving tank 100, which is made of adequate capacity for this purpose.

When the pressure tank 106 has reached operating pressure, a solenoid operated three way valve 118 is operated to connect tank 106 to a conduit 120. Conduit 120 extends (see FIG. 2) into the bottom of the flotation tank 4 and contains, at its end located in the flotation tank, a pressure relief valve 122. When the pressure relief valve 122 is opened, the pressure in the tank 106 expels pressurized and aerated liquid therefrom through the conduit 120 and into the flotation tank 4. The pressure in the liquid passing through conduit 120 is maintained until the liquid passes through the relief valve 122, so that the dissolved air does not come out of the solution and form bubbles until the liquid has passed into the flotation tank 4. This ensures that a maximum number of small bubbles will be formed in the flotation tank 4 and prevents bubbles from forming and enlarging in the conduit 120. Because pressure is not released in the conduit 120, very high pressures (200 to 500 psi or more) can be used, increasing the flotation efficiency.

While the contents of pressure tank 106 are being expelled into the flotation tank 4, the three way valve 104 is operated to divert the contents of the receiving tank 100, together with further flow from conduit 76, into a second pressure tank 124. The second pressure tank 124 is fitted with low and high liquid level probes 126, 128 identical with probes 106, 108. When the liquid level in the second tank 124 reaches the upper probe 128, the solenoid valve 104 is again closed (by conventional control means not shown) and compressed air is admitted to the tank 124 via conduit 112, three way valve 114 and diffuser 130, to pressurize the second tank. The capacity of each pressure tank 106, 124 is preferably made such that during filling and pressurizing of one tank, the other tank can continue to supply pressurized and aerated liquid to the flotation tank 4.

When the liquid level in the first pressure tank 106 falls to the bottom probe 108, the valve 118 disconnects the first tank from the conduit 120 (by conventional control means not shown), and a vent valve 134 then operates (by control means not shown) to vent tank 106 to atmosphere to ensure complete depressurization. When valve 118 disconnects tank 106 from the conduit 120, it simultaneously connects tank 124 to the conduit 120, so that the flotation tank 4 will continue to be supplied with pressurized aerated liquid. Tank 106 is then refilled (after refilling the vent valve closes); then tank 106 is repressurized and the cycle is repeated.

The proportion of clarified effluent from launder 64 that is diverted by conduit 76 for pressurization and aeration may be from ten to ninety percent of the total volume of clarified effluent removed from the gravity clarifier 6 (depending on the quantity of particles to be floated and on the retention time in the tank 4). Typically about fifty percent of the clarified effluent will be pressurized and aerated. In cases where the proportion is lower, the areation equipment described may be smaller and of lower capacity.

As shown in FIG. 1, the conduit 78 which conducts clarified liquid directly from the outer tank 6 to the inner tank 4 extends slopingly downwardly through the inner tank 4 and terminates in an upwardly extending leg 140 (FIG. 2) centered in the inner tank 4. The conduit 120 extends upwardly through the leg 140 with the relief valve 122 being located near the upper end of the leg 140 (and also being a short distance above the bottom of inner tank 4). This arrangement ensures that the liquid entering tank 4 via conduit 78 will mix adequately with the contents of tank 4. If desired, one or more motor driven dispersing rotors (not shown) may be placed in the tank 4 to improve the mixing and flotation action.

To ensure that adequate flotation is achieved and to prevent removal of floated particles with the clarified effluent from tank 4, three baffles are provided. Firstly, a horizontal circular baffle 142 (which is optional) may be provided (FIG. 2) above the valve 122, to direct air bubbles and liquid outwardly. This improves the dispersion of air in the liquid. Secondly, an upstanding feed well or baffle 144 is provided encircling the valve 122 and leg 140. Thirdly, a submerged baffle 146 is provided, encircling and spaced inwardly from the inner surface of wall 8. The baffle 146 is supported from the wall 8 by supports 148 and carries at its top a launder 150.

In operation, liquid flow will follow the path of arrows 152 (FIG. 2). Because the top of feed well 144 is higher than the bottom of baffle 146, and because the launder 150 is the only exit for liquid in tank 4, the liquid after it leaves the feed well 144 must travel downwardly in order to exit from tank 4. The air bubbles, of course, will travel upwardly. This ensures adequate separation between the air bubbles (and the material floated thereby) and the treated liquid leaving the tank 4. Fully clarified effluent from the launder 150 is removed via conduit 154 (FIGS. 1, 2) by an effluent pump (not shown).

It will be seen that since the inner tank launder 150 is much lower than the outer tank launder 64, the liquid level 156 in the inner tank 4 is maintained substantially below the liquid level 66 in the outer tank 6. The difference in levels permits flow of clarified liquid from the outer tank 6 to the inner tank 4 via conduit 78, eliminating the need for a pump.

To remove floated material in the inner tank 4, a second scum skimmer 160 is provided. The skimmer 160 includes a pair of skimmer blades 162 suspended from the inner end of the bridge 36 by a framework 164. The skimmer blades 162 are pivotally connected to the framework 164 in the same manner as the blades 82, 83 of the outer skimmer 80 and travel between an inner scum baffle 118 (to be described) and the wall of the launder 150.

The scum skimmed by scum skimmer 160 is pushed up a scum box ramp 166 (FIG. 1) into a scum box 168 (FIGS. 1, 4) from which it is removed via conduits 170, 90 by the common scum pump 92. Conventional means (not shown) are provided to raise the blades 162 above the liquid surface during travel of scum skimmer 160 from limit 58 to limit 60.

Figure 6:
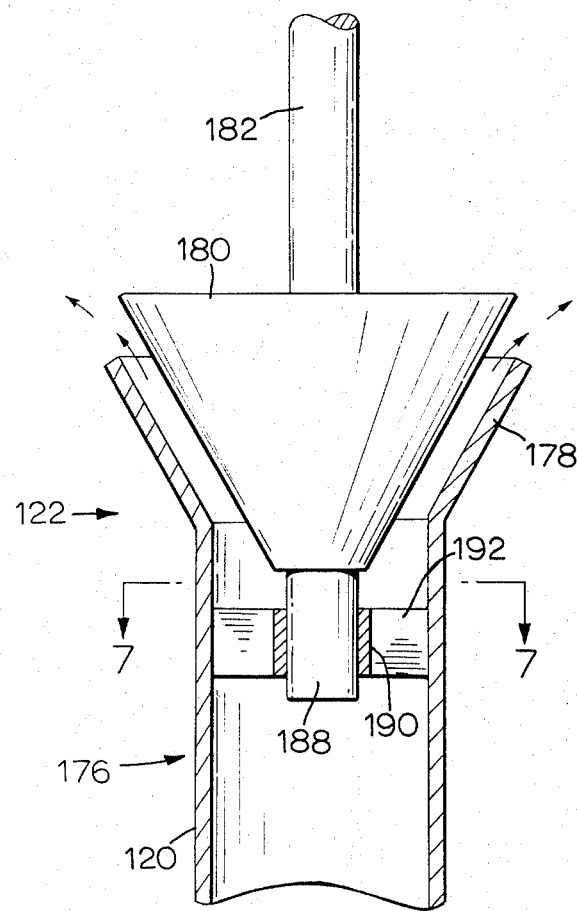
FIG. 6 is a sectional view showing a pressure relief valve for use with the invention.
Figure 7:
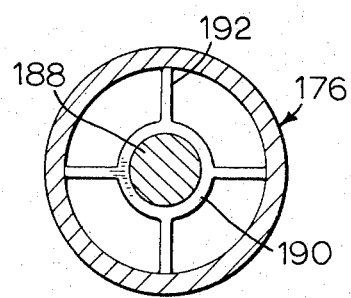
FIG. 7 is a sectional view taken along lines 7—7 of FIG. 6.

Reference is next made to FIGS. 6 and 7, which show a preferred form of pressure relief valve 122 according to the invention. As shown, the pressure relief valve 122 includes a valve casing 176 integral with the end of the conduit 120 and having a cone-shaped outer end 178. A cone-shaped valve member 180 co-operates with the outer end 178 of the valve casing, and is raised and lowered therein by an operating shaft 182 secured thereto. The operating shaft 182 is journalled in a guide sleeve 184 (FIG. 2) mounted on the bottom 12 of the inner tank 4 by support struts 186 (FIG. 1). If desired, a guide pin 188 may be provided at the bottom of the valve member 180 and slides in a guide sleeve 190 centered in the valve casing 176 by legs 192, thus providing additional guidance for the valve member 180.

In operation, it will be seen that when the cone-shaped valve member 180 is lowered until its lower surface contacts the cone-shaped outer end 178 of the valve casing, then the relief valve 122 will be closed. As the cone-shaped valve member 180 is raised, the valve opening increases, allowing an increasing flow of liquid to escape into the flotation tank 4. The position of the valve member 180 is controlled by providing a screw thread 192 (FIG. 2) on the shaft 182, co-operating with a threaded bushing 194 secured to the guide sleeve 184 by legs 195, so that rotation of a hand wheel 196 secured to the top of the shaft 182 will adjust the valve position.

It will be seen that the top of the guide sleeve 184 is flared outwardly to form the scum baffle 118. This reduces the surface area of the tank 4 that must be skimmed. In addition, the bottom of the guide sleeve may extend outwardly to form the optional baffle 142.

Figure 8:
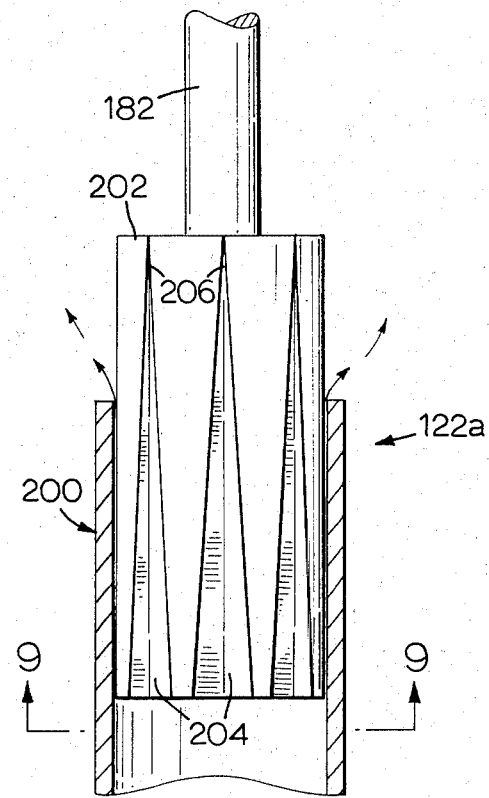
FIG. 8 is a sectional view of a modified pressure relief valve.
Figure 9:
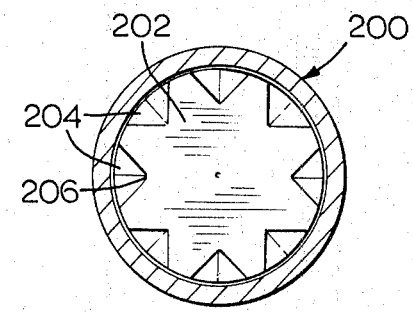
FIG. 9 is a sectional view of the valve member of the FIG. 8 valve.

Reference is next made to FIGS. 8 and 9, which show an alternative pressure relief valve 122a. As shown, the pressure relief valve 122a, includes a cylindrical valve casing 200 again formed integrally with the end of the conduit 120. Located in the casing 200 is a cylindrical valve member 202 having a number of V-shaped grooves 204 extending longitudinally along its surface. The grooves 204 are spaced circumferentially from each other and each is of maximum width and depth at the bottom of the valve member 202, tapering in both width and depth to a closure 206 at the upper end of the valve member 202. The valve member 202 fits snugly but slidably in the casing 200. Thus, when the valve member 202 is lowered completely into the casing 200, substantially no liquid is allowed to escape from the conduit 120. As the valve member is raised, the valve opening increases in size as the total area of the portions of the grooves 204 aligned with the upper end of the casing 200 increases. Thus, as the valve member 202 is raised in the casing 200, more liquid is allowed to escape into and to depressurize in the flotation tank 4.

Figure 10:
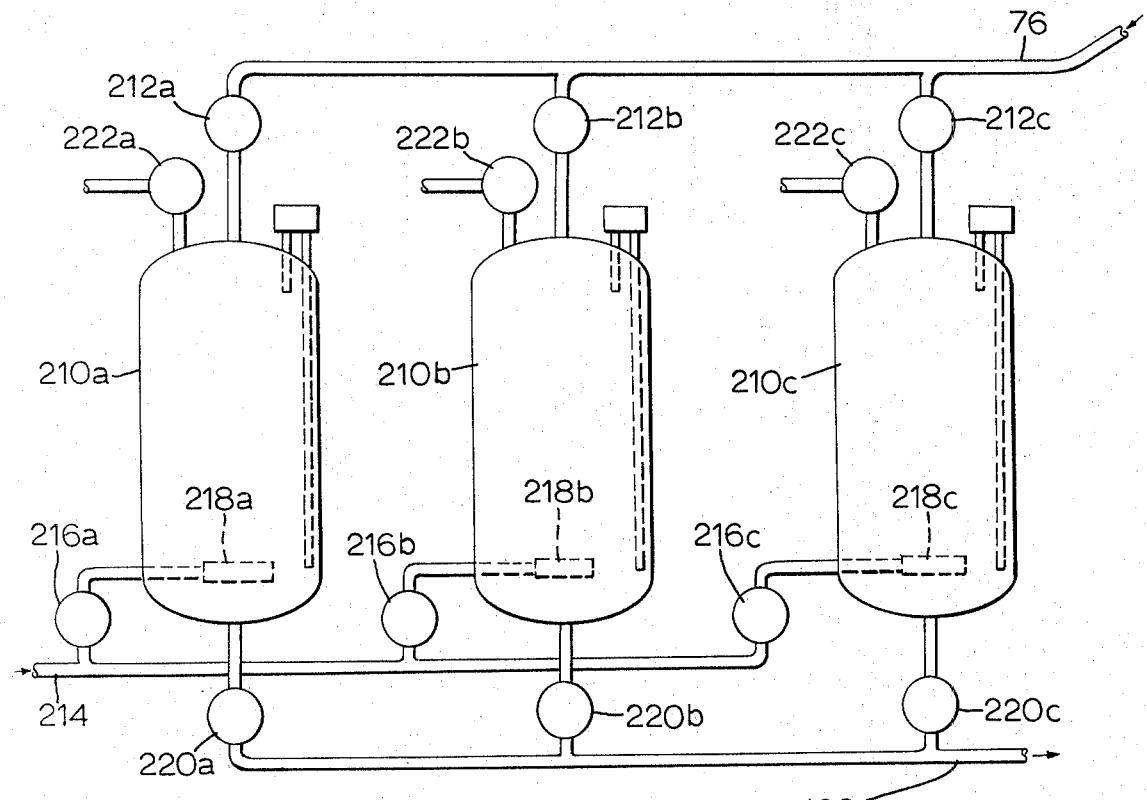
FIG. 10 is a schematic view showing a modified air dissolving system for use with the invention.

Reference is next made to FIG. 10, which shows an alternative aeration and pressurization arrangement for the system. In the FIG. 10 arrangement, a series of pressure tanks 210a, 210b, 210c is provided. (Although three such tanks are shown, more can be used if desired.) The tanks 210a, 210b, 210c operate in sequence on a fill cycle, pressure aeration cycle, discharge cycle, and vent. Primary effluent from the gravity clarifier 6 is conducted via conduit 76 and solenoid valves 212a, 212b, 212c to the respective tanks; compressed air is admitted via conduit 214, solenoid valves 216a, 216b, 216c and diffusers 218a, 218b, 218c; and the tanks are discharged via solenoid valves 220a, 220b, 220c and conduit 120 to the flotation clarifier 4. Venting to atmosphere is provided via valves 222a, 222b, 222c. Conventional control means, not shown, are provided to control the valves so that while one tank is discharging its contents into conduit 120, another of the tanks vents and then fills, while the third is pressurized.

What I claimed is:

1. A combined gravity separation and dissolved air flotation clarifier comprising:
   a. an inner flotation tank,
   b. an outer gravity clarifier tank encircling said inner tank,
   c. sludge scraping means for removing settled sludge from said outer tank,
   d. means for introducing liquid to be clarified into said outer tank,
   e. a launder in said outer tank for removing clarified liquid from the top of said outer tank,
   f. a second launder in said inner tank, said second launder being located at a level substantially below that of said first launder,
   g. first conduit means for removing by gravity a first portion of clarified liquid from said first launder,
   h. second conduit means for conducting by gravity to said inner tank the remainder of the clarified liquid from said first launder,
   i. means for dissolving air at substantial pressure in said first portion of the clarified liquid, thereby producing pressurized aerated liquid,
   j. means for introducing said pressurized aerated liquid into said inner tank, for said air to float particles therein,
   k. and means for removing clarified liquid from said second launder.

2. Apparatus according to claim 1 wherein each of said tanks includes scum skimmer means, said apparatus including common power means for driving said scum skimmer means of each tank and said sludge scraper.

3. Apparatus according to claim 2 wherein said means for introducing said pressurized aerated liquid into said flotation tank includes a conduit extending into said flotation tank and terminating at an end located in said flotation tank, means for admitting said pressurized aerated liquid into said conduit, and a pressure relief valve in said end of said conduit for maintaining liquid in said conduit under pressure and for releasing such pressure only when such liquid is released into said flotation tank.

4. Apparatus according to claim 3 wherein said means for dissolving air includes an aeration tank, means for conducting by gravity said remainder of said clarified liquid to said aeration tank, means for selectively admitting compressed air to said aeration tank to produce said pressurized aerated liquid, said means for introducing comprising means for selectively connecting said aeration tank to said conduit, so that said pressurized aerated liquid is propelled from said aeration tank into said flotation tank solely by the pressure in said aeration tank and in said conduit.

5. Apparatus according to claim 4 wherein said pressure relief valve comprises a valve casing mounted at said end of said conduit, a valve member mounted in said valve casing and co-operating therewith for movement vertically between a first position in which said valve is closed and a second position in which said valve is open, a vertically oriented control shaft connected to said valve member and extending upwardly therefrom through said flotation tank, and control means connected to said shaft for adjustment of said relief valve.

6. Apparatus according to claim 5 wherein said valve casing includes a cone-shaped member opening upwardly, and said valve member is cone-shaped, whereby axial movement of said valve member in said cone-shaped member will vary the opening of said valve.

7. Apparatus according to claim 5 wherein said valve member and said valve casing are both cylindrical, said valve member fitting snugly but slidably in said valve casing, said valve member having a plurality of V-shaped grooves in its outer surface, said V-shaped grooves being oriented vertically and tapering inwardly from the bottom to the top of said valve member and being closed at the top of said valve member, so that as said valve member is raised in said valve casing, the area of the portion of said grooves aligned with the top of said casing will increase, thereby increasing the opening of said valve.

8. Apparatus according to claim 1 wherein said means (d) includes means for introducing said liquid to be clarified into said outer tank in a path for laminar flow around the circumference of said outer tank.

* * * * *